United States Patent [19]

Klein

[11] 4,308,690
[45] Jan. 5, 1982

[54] PLANTER

[75] Inventor: Max S. Klein, Hollywood, Fla.

[73] Assignee: Klein Plastic Products, Inc., Baraboo, Wis.

[21] Appl. No.: 146,643

[22] Filed: May 5, 1980

[51] Int. Cl.³ .................................................. A01G 25/00
[52] U.S. Cl. .................................................. 47/79
[58] Field of Search .................. 47/39, 66, 79, 80, 81, 47/82, 83, 41, 41.1, 41.12, 42.71

[56] References Cited

U.S. PATENT DOCUMENTS

| | | | |
|---|---|---|---|
| D. 201,445 | 6/1965 | Kaelke | D11/152 |
| D. 224,120 | 7/1972 | Kaelke | D11/152 |
| 248,213 | 10/1881 | Polsgrave | 47/66 |
| 253,716 | 2/1882 | Johnston | 47/82 |
| 2,814,911 | 12/1957 | Shep | 47/80 |
| 2,863,259 | 12/1958 | Radford | 47/80 |
| 2,870,574 | 1/1959 | Sheridan | 47/79 X |
| 3,949,524 | 4/1976 | Mickelson | 47/66 |
| 4,062,147 | 12/1977 | Phillips | 47/71 |

FOREIGN PATENT DOCUMENTS

| | | | |
|---|---|---|---|
| 1284295 | 1/1962 | France | 47/79 |
| 291411 | 9/1953 | Switzerland | 47/81 |

Primary Examiner—James R. Feyrer
Attorney, Agent, or Firm—George H. Mortimer

[57] ABSTRACT

The planter comprises a container for soil having a bottom wall with an aperture, a base having a top wall with an aperture, a tubular member having a liquid tight connection with said walls surrounding said apertures holding said walls in spaced axial alignment, a foraminous support ring connected to said top wall within said base surrounding the aperture, a soil retaining closure for the lower end of said support ring, a transparent water receptacle in said base having a liquid tight, removable connection therewith, thereby forming a water reservoir of substantial volume, and a sight opening in said base below the liquid tight connection for viewing the contents of the receptacle. The container, base and tubular member are a unitary, injection molded, opaque plastic article of attractive color and finish. In use the container and tubular member are filled with soil in which seeds, cuttings, transplants and the like can be planted and watered. All water in excess of that which the soil adsorbs from a watering flows down into the reservoir formed by the base and receptacle from which it is withdrawn and transferred by capillary attraction back into the soil as it dries out. Because of the volume of the water reservoir, the time the soil may remain moist from a watering is prolonged in comparison with devices using saucers of similar dimensions and danger of water damage to the surface on which the planter is supported from overflow is avoided.

10 Claims, 4 Drawing Figures

PLANTER

INTRODUCTION

The present invention relates to a planter or pot especially adapted for growing plants. The plants may be grown in the pot from seeds, cuttings or the like or they may be transplanted from some other environment into the planter. The planter provides a healthful environment for the plant comprising soil, moisture and other nutrients, if desired.

BACKGROUND OF THE INVENTION

The need for suitable planters or pots for living plants has been recognized by workers in this art for many decades. As an example of this early recognition see U.S. Pat. No. 248,213 granted Oct. 11, 1881 to A. D. Polsgrove. In general the art has recognized that such a planter should comprise a container for soil in which the roots of the plant grow and a receptacle for any excess water that is supplied to the plant. See, for example, the U.S. Pat. Nos. 2,814,911 granted Dec. 3, 1957 to Shep; 2,863,259 granted Dec. 9, 1958 to Radford; 3,949,524 granted Apr. 13, 1976 to Nickelson and 4,062,147 granted Dec. 13, 1977 to Phillips. Planters are commonly used in greenhouses and in gardens, frequently in contact with soil and sometimes on supports such as tables or the like. Conventionally they are made of clay and have the rather unattractive appearance of an ordinary clay flower pot. If they are used indoors a vase of some kind in which the planter can be placed and concealed is considered desirable or necessary.

SUMMARY OF THE INVENTION

The present invention provides a planter that may be and preferably is made of molded plastic of attractive color and finish comprising a base forming a water reservoir with a water receptacle, a soil container, a connecting tubular member for holding the base and container in spaced axial alignment and a soil retaining closure for the lower end of the tubular member. The tubular member, which in use is filled with soil, serves as a means for conducting excess water from the container to the water receptacle and as a means to transport water from the reservoir to the soil in the pot by capillary attraction. The bottom wall of the container and the top wall of the base make liquid tight connection with the tubular member around apertures through which water or moisture passes into and out of the tubular member in both directions. Surrounding and above aperture in the bottom of the container a water permeable guard ring preferably is provided to hold back soil in the container while permitting moisture to flow out. Surrounding and below the aperture in the top wall of the base a foraminous support ring preferably is provided which is long enough to receive the soil retaining closure which makes contact with the bottom wall of the water receptacle when it is situated in the base while permitting water to flow out and cover the area of the bottom wall. The base, connecting tube and container are preferably made integral of an opaque plastic. The water receptacle is preferably made of a transparent plastic. The soil retaining closure may be transparent or opaque plastic. A preferred method of manufacturing the planter is by injection molding of suitable plastic compositions in properly constructed molds in accordance with established practice which forms no part of the present invention.

BRIEF DESCRIPTION OF THE DRAWINGS

The best known embodiment of the invention will be described in conjunction with the drawings illustrating it in which.

DETAILED DESCRIPTION OF THE INVENTION

Figure 1:
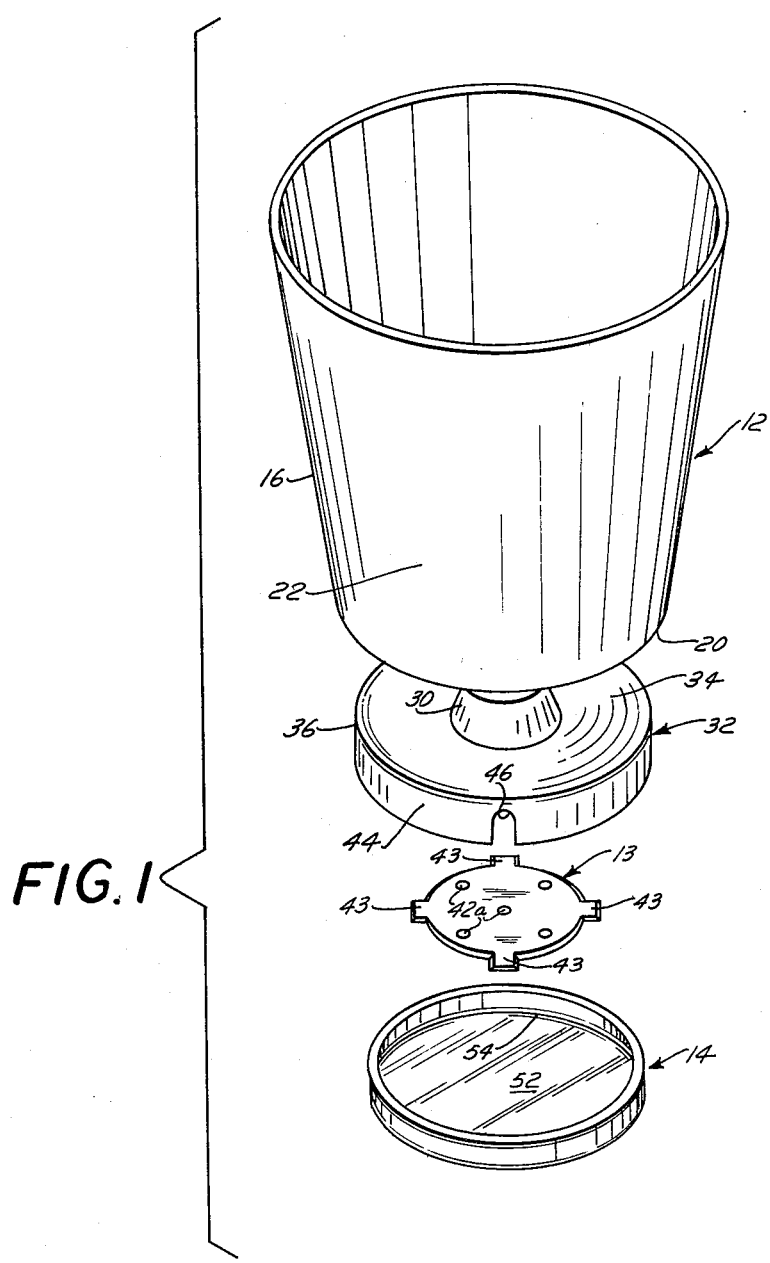
FIG. 1 is an exploded isometric view of the planter of the invention showing the soil retaining closure and the water receptacle which are normally concealed within the base of the planter separate from and below the base.

Referring first to FIG. 1, the planter which is referred to generally by reference numeral 10 comprises three parts, a plant holder 12, a soil retaining closure 13 and a water receptacle 14.

Figure 3:
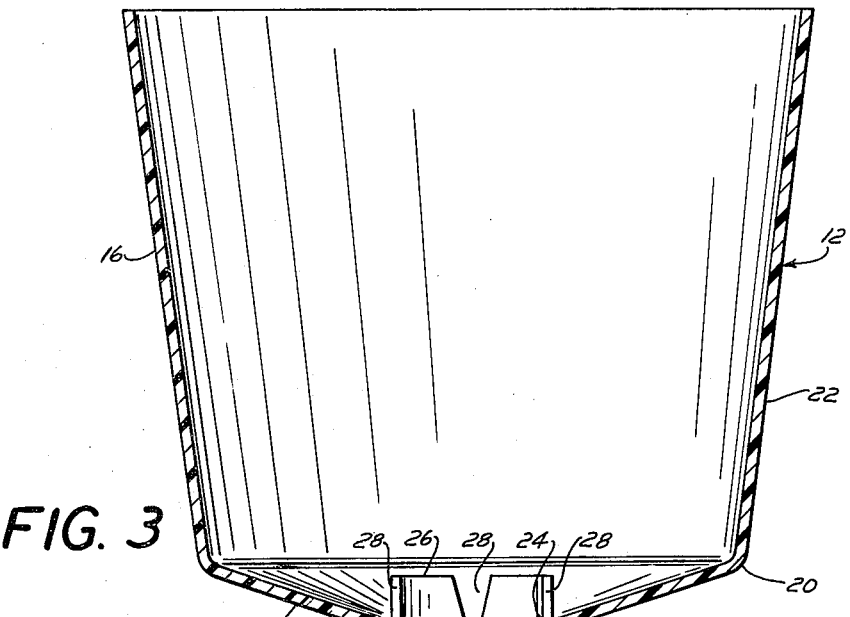
FIG. 3 is a vertical sectional view on a plane through the axis of the planter along the line 3—3 of FIG. 2.

Referring now also to FIG. 3, the plant holder 12 comprises a container 16 having a bottom wall 18 with a periphery 20 that may have any convenient shape. In the embodiment illustrated in the drawings the periphery 20 is circular but it is within the contemplation of the invention that it may be of any polygonal shape such as a square, a hexagon, octagon, etc. Extending upwardly from the periphery 20 is an upstanding continuous wall 22 of any desired length or height and it may make any desired angle with respect to the axis of the planter. A desirable height is within the range of 0.5 to 1.5 times the diameter of the base 18. The wall 22 may be parallel to the axis of the planter, i.e., make a zero angle with respect thereto, but preferably the container is flared outwardly, from the bottom to the top, up to an angle of about 30 degrees and preferably at an angle within the range of about 5 to 10 degrees to the axis of the planter. This outwardly flaring shape permits the removal of the plant and its soil intact from the planter by turning it upside down and tapping the edge of the container against some solid object to dislodge the soil and root system of the plant from the wall of the container.

The bottom wall 18 of the container 16 may also make any desired angle with respect to the axis of the planter from the horizontal, i.e., a right angle, to as low as about 60 degrees but preferably the slope is somewhere within the range of about 70–80 degrees, giving the bottom wall a downward gradient from the periphery toward the axis so that water will naturally run down the sloping wall toward the center.

Centrally of the bottom wall 18 is an aperture 24 which serves as an outlet for water that flows down the bottom wall 18. Aperture 24 is preferably surrounded by a foraminous guard ring 26 which serves to hold back soil on the bottom wall 18 of the container while permitting water to flow through it and out of the aperture 24. A convenient way to make the guard ring foraminous is to provide a plurality of orifices or notches 28 which may extend from the upper edge of the guard ring to the upper surface of the bottom wall 18.

A tubular connecting member 30 is secured in liquid tight relationship to the bottom wall 18 at the upper end and to a base 32 at the lower end, holding them in spaced axial alignment. The base is provided with a top wall 34 having a periphery 36 and an aperture 38 which the tubular member 30 surrounds. The top wall 34 of the base 32 may also make any desirable angle with respect to the axis of the planter but preferably it slopes downwardly a few degrees, e.g., up to about 5 degrees from the horizontal or about 95 degrees from the axis of the planter. A foraminous support ring 40 is provided which is long enough to extend from the under surface of the top wall 34 to the upper surface of the bottom wall of the water receptacle 14 soon to be described. The support ring 40 may be made foraminous by providing orifices or notches 42 in the lower end thereof as clearly seen in FIG. 2 and FIG. 3.

Figure 2:
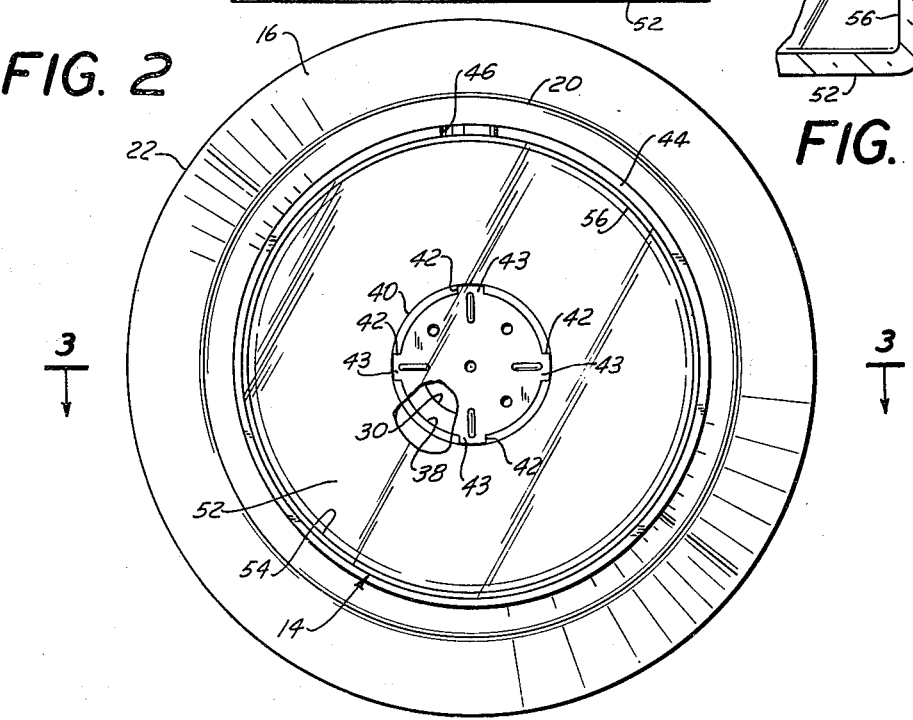
FIG. 2 is a bottom plan view of the planter with a portion broken away to show interior structure.

The soil retaining closure 13 fits tightly but removably in the lower end of the ring 40 with projections 43 in the notches 42 (see FIG. 3). By forming the side edges of the notches on a diverging angle, as shown, and by similarly shaping the side edges of the projections 43, a tight fit is readily achieved when the lower surface of the closure 13 is aligned with the lower end surface of the ring 40. This gives good support to the ring 40 from the water receptacle 14, as described more fully hereinafter, and leaves the upper part of the orifices 42 open for movement of water in and out of tube 30. Additional water openings 42a may be provided in closure 13 as illustrated in FIGS. 1 and 2.

Depending from the periphery 36 of the top wall 34 of the base 32 is a flange 44 which preferably is approximately parallel with the axis of the planter. The periphery 36 may have any desired shape as already described for the periphery 20 of the container 16 and preferably they have the same shape but may be somewhat different in size. Generally speaking a circular shape is simplest to make and is preferred. The flange 44 may be provided with a sight opening 46 to permit observation of the contents of the water receptacle 14. A groove 47 is provided completely around the inner surface of the flange 44 adjacent to its junction with top wall 34 and above the level of the sight opening 46 for a purpose soon to be described.

The base is large enough to give stable support to the planter. Generally speaking it will be at least about half the diameter of the bottom wall of the container and preferably has a diameter of about 80% to 100% thereof. The tubular connecting member 30 may have any desired length and diameter. Conveniently the length is within the range of 8-15% of the height of the planter and the diameter is within the range of 50% to 150% of its length.

Figure 4:
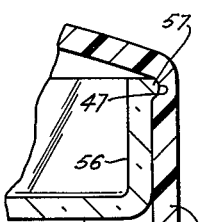
FIG. 4 is a fragmentary vertical sectional view on the line 3—3 of FIG. 2 showing the joint between the base and the water receptacle on a larger scale.

The water receptacle 14 comprises a bottom wall 52 having a periphery 54 of the same shape as the periphery 36. Upwardly extending from the periphery 54 is a wall 56 which also preferably is approximately parallel to the axis of the planter. The flange 44 and the wall 56 are so related in height or width that the water receptacle can be placed completely within the recess in the base formed by the flange 44, as more particularly seen in FIG. 3. The height of flange 44 is sufficient to provide desirable capacity in the water receptacle. A height of flange within the range of about 6% to 18% of the height of the container, preferably about 12%, is satisfactory. An enlargement or ring 57 surrounds the upper end of wall 56 to snap into groove 47 in wall or flange 44 described above for the purpose of making a liquid tight connection between the base 32 and the water receptacle 14. See FIG. 4. The weight of the planter is normally carried by the flange 44 which is adapted to rest on any horizontal surface such as a table top, cabinet, or the like. Support ring 40 and closure 13 may provide supplementary support if a heavy load is put on the container. The size of the water receptacle with respect to the base is preferably such that the enlargement 57 makes sufficient frictional contact with the interior groove 47 of the flange 44 to hold the water receptacle removably within and in liquid-tight relationship with the base 32, as clearly seen in FIGS. 3 and 4. With this structure the base is a water reservoir.

The planter may be made of any suitable material such as rust resistant metal, but is preferably made of moldable plastics of any suitable compositions. A preferred method of manufacture is injection molding in suitable molds. Those skilled in the art will recognize that the parts of the planter are so shaped as to be easily removable from injection molds. Preferably the plant holder 12 is made in one piece of a suitable opaque plastic material of any desired attractive color. The closure 13, which is not normally visible in use, is preferably made of plastic and may be opaque or transparent, as desired. The water receptacle 14 is preferably made of a suitable transparent plastic material so that the depth of any water contained therein can readily be observed through the sight opening 46. The plant holder 12, however, can also readily be made in three parts, the container 16, the tubular connecting member 30 and the base 32 with the tubular member 30 having spaced water tight connection by adhesive, heat seal and the like with the bottom wall 18 and the top wall 34. In this instance the guard ring 26 and the support ring 40 may be extensions of the tubular member 30 and they may be regarded as extensions thereof even in the embodiment which is injection molded as a unit.

In use of the planter, the soil retaining closure 13 is inserted as shown in FIGS. 2 and 3 in the lower end of the tubular connecting member 30 and the container 16 and tube 30 are then filled with suitable soil to the desired level. Any desired seeds, cuttings, transplanted plants and the like are embedded in the soil in the container and may then be watered in the usual manner, with or without addition of other nutrients. The water seeps down through and moistens the soil. Any excess water which is not adsorbed onto the particles of the soil above it will flow down the sloping wall 18, through the foraminous guard ring 26 and into soil in the tubular connecting member 30 which may also receive water from the soil in the container 16 above it. This water in the soil in tube 30 flows through the aperture 38 in the top wall 34 of the base into the water receptacle 14. As water flows into the receptacle 14, the height thereof can be observed through the sight opening 46. In the event that the amount of water poured into the container 16 is large enough to more than fill receptacle 14, it is not necessary to remove and empty the water receptacle 14 because the liquid tight joint between receptacle 14 and flange 44 of the base 32 make the entire volume within the base a water reservoir that retains all the water within the planter and avoids wetting the surface upon which the planter is resting. The foraminous guard ring 26, while not essential, is desirable because it tends to stabilize the position of the soil in the container 16 so that it is not solidly packed into the tubular connecting member 30 by any excess water that is poured into the container 16. As the soil in container 16 dries out, the soil in tubular connector 30 transports water from receptacle 14 back into the soil in container 16 by capillary attraction to prolong the time the soil remains moist from a watering. The support ring 40 gives strength to the top wall 34 and prevents undue stress being generated therein by weight of the contents of the container 16, and of any object that may be laid on the upper rim of the container, by direct support from the surface on which the planter rests through bottom wall 52, closure 13, support ring 40 and connecting tube 30 to container 16.

While the invention has been described and illustrated in conjunction with the best known embodiment thereof, those skilled in the art will recognize that modifications and variations may be made in the planter without departing from the principle of the invention as described and without departing from the scope of the appended claims.

Having thus described and illustrated the invention, what is claimed is:

1. A planter comprising a plant holder made of opaque plastic having
  (a) a container adapted to hold soil for a plant having a bottom wall with an aperture,
  (b) a base having a top wall with an aperture and a depending peripheral flange adapted to rest on a supporting surface,
  (c) a tubular member holding said bottom wall and said top wall in spaced axial alignment by liquid tight connection to said walls surrounding said apertures adapted to conduct excess water from the container into the base,
  (d) a separate, removable soil retaining closure for the lower end of said tubular member, and
  (e) a transparent plastic water receptacle adapted to be held within and in liquid tight relation to said base to receive such water.

2. A planter as set forth in claim 1 in which said base has a sight opening in said flange through which the water receptacle can be seen.

3. A planter comprising
  (a) a container having a bottom wall with an aperture and an outer periphery and a wall extending upwardly from said outer periphery of said bottom wall,
  (b) a base having a top wall with an aperture and an outer periphery and a flange extending downwardly from the outer periphery of said top wall adapted to rest on a supporting surface,
  (c) a tubular member holding said bottom wall and said top wall in spaced axial alignment by liquid tight connection with said walls surrounding said aperture,
  (d) a support ring having a foraminous side wall in said base surrounding said aperture in said top wall, and
  (e) a removable water receptacle within said base having a bottom wall and a periphery, a wall extending upwardly from said periphery forming a liquid-tight connection with the inside surface of the downwardly extending flange from the base and providing frictional contact between said wall and flange to removably retain the water receptacle in said base.

4. A planter as set forth in claim 3 which includes a guard ring having a foraminous side wall in said container surrounding the aperture in said bottom wall.

5. A planter as set forth in claim 4 in which said container, base, tubular member, guard ring and support ring are integral parts of a unitary molded plastic body.

6. A planter as set forth in claim 3 in which the upwardly extending wall of said container diverges outwardly from the bottom wall at an angle within the range of 0 to 30 degrees to the axis of the planter.

7. A planter as set forth in claim 6 in which the bottom wall of said container slopes downwardly from the periphery thereof to the aperture therein at an angle within the range of 80 to 90 degrees to the axis of the planter.

8. A planter as set forth in claim 7 in which the top wall of said base slopes upwardly from its periphery to the aperture therein at an angle within the range of 90 to 95 degrees to the axis of the planter.

9. A planter as set forth in claim 3 in which the lower end of said support ring is in contact with the bottom wall of said water receptacle.

10. A planter as set forth in claim 3 in which said water receptacle is made of transparent plastic and the downwardly extending flange of said base has a sight opening therein below the liquid tight connection.

* * * * *